(12) United States Patent
Li et al.

(10) Patent No.: US 12,441,158 B2
(45) Date of Patent: Oct. 14, 2025

(54) VALVE SET INTEGRATED MODULE, VEHICLE THERMAL MANAGEMENT SYSTEM, AND VEHICLE

(71) Applicant: BYD COMPANY LIMITED, Guangdong (CN)

(72) Inventors: Shibai Li, Shenzhen (CN); Wei Jin, Shenzhen (CN); Min Xu, Shenzhen (CN); Meijiao Ye, Shenzhen (CN); Yuzhong Li, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 194 days.

(21) Appl. No.: 18/374,204

(22) Filed: Sep. 28, 2023

(65) Prior Publication Data
US 2024/0017588 A1 Jan. 18, 2024

Related U.S. Application Data

(63) Continuation of application No. PCT/CN2022/095517, filed on May 27, 2022.

(30) Foreign Application Priority Data

May 31, 2021 (CN) .......................... 202110600866.6

(51) Int. Cl.
*B60H 1/00* (2006.01)
*F25B 41/20* (2021.01)

(52) U.S. Cl.
CPC ..... *B60H 1/00485* (2013.01); *B60H 1/00278* (2013.01); *B60H 1/00321* (2013.01);
(Continued)

(58) Field of Classification Search
CPC ............ B60H 1/00485; B60H 1/00278; B60H 1/00321; B60H 1/00792; B60H 1/00885;
(Continued)

(56) References Cited

U.S. PATENT DOCUMENTS

| | | | |
|---|---|---|---|
| 2020/0132204 A1 | 4/2020 | Krost et al. | |
| 2021/0053415 A1 | 2/2021 | Oh et al. | |

FOREIGN PATENT DOCUMENTS

| | | |
|---|---|---|
| CN | 205970883 U | 2/2017 |
| CN | 205980092 U | 2/2017 |

(Continued)

OTHER PUBLICATIONS

International Search Report and Written Opinion for Application No. PCT/CN2022/095517, mailed on Aug. 23, 2022, 12 pages.
(Continued)

*Primary Examiner* — Kun Kai Ma
(74) *Attorney, Agent, or Firm* — Sheppard Mullin Richter & Hampton LLP

(57) ABSTRACT

An integrated valve module includes a body including first flow channel that includes a first branch channel; an interface disposed on the body and including an indoor condenser outlet interface, an outdoor heat exchanger inlet interface, and a first interface of a motor heat exchanger; and a valve set disposed on the body and including a first electric valve and a second electric valve. A first port of the first electric valve is connected with the indoor condenser outlet interface. A second port of the second electric valve is connected with the outdoor heat exchanger inlet interface, and a third port thereof is connected with the first interface of the motor heat exchanger. A first opening communicates with a second port and a third port of the first electric valve, and a second opening communicates with a first port of the second electric valve, are disposed on the first branch channel.

20 Claims, 9 Drawing Sheets

(52) U.S. Cl.
CPC ..... B60H 1/00792 (2013.01); B60H 1/00885 (2013.01); F25B 41/20 (2021.01)

(58) Field of Classification Search
CPC .... B60H 1/00007; F25B 41/20; F25B 25/005; F25B 2313/004; F25B 2313/02732; F25B 2400/0403; F25B 2400/0409; F25B 41/42
See application file for complete search history.

(56) References Cited

FOREIGN PATENT DOCUMENTS

| | | | | |
|---|---|---|---|---|
| CN | 108068572 | A | | 5/2018 |
| CN | 108534590 | A * | 9/2018 | .............. F28F 27/02 |
| CN | 109747383 | A | | 5/2019 |
| CN | 110411247 | A | | 11/2019 |
| CN | 110914081 | A * | 3/2020 | ......... B60H 1/00485 |
| CN | 111038216 | A | | 4/2020 |
| CN | 111169325 | A * | 5/2020 | ......... B60H 1/00385 |
| CN | 111251802 | A | | 6/2020 |
| CN | 210941251 | U * | 7/2020 | ......... B60H 1/00271 |
| CN | 111976416 | A | | 11/2020 |
| CN | 112428769 | A | | 3/2021 |
| CN | 112428774 | A | | 3/2021 |
| CN | 112431946 | A | | 3/2021 |
| CN | 112432396 | A | | 3/2021 |
| CN | 112606676 | A | | 4/2021 |
| CN | 219618874 | U * | 9/2023 | |
| CN | 116872695 | A * | 10/2023 | |
| DE | 4441351 | A1 | | 5/1996 |
| JP | H1123071 | A | | 1/1999 |
| JP | 2017227364 | A | | 12/2017 |
| JP | 2020034178 | A | | 3/2020 |
| JP | 2021047000 | A | | 3/2021 |
| WO | 2014/030884 | A1 | | 2/2014 |
| WO | 2021/048095 | A1 | | 3/2021 |
| WO | WO-2021049435 | A1 * | 3/2021 | ......... B60H 1/00342 |

OTHER PUBLICATIONS

First Office Action and Search Report dated Mar. 29, 2025, issued in related Chinese Application No. 202110600866.6, with English machine translation (19 pages).

New Car Tech, "Thermal Management System for Jaguar I-PACE Electrical Car (V)," China Academic Journal Electronic Publishing House, 1994-2023, Aug. 1, 2020, pp. 58-61, with English machine translation.

\* cited by examiner

VALVE SET INTEGRATED MODULE, VEHICLE THERMAL MANAGEMENT SYSTEM, AND VEHICLE

CROSS-REFERENCE TO RELATED APPLICATIONS

This application is a Continuation Application of International Patent Application No. PCT/CN2022/095517, filed on May 27, 2022, which is based on and claims priority to and benefits of Chinese Patent Application No. 202110600866.6, filed on May 31, 2021. The entire content of all of the above-referenced applications is incorporated herein by reference.

FIELD

The present disclosure belongs to the field of vehicle technologies, and particularly, to an integrated valve module, a vehicle thermal management system, and a vehicle.

BACKGROUND

A heat pump air conditioning system is an important part of a vehicle, which can change the temperature in the vehicle so that a driver and passengers can obtain a good riding experience. Each component of a heat pipe system in the related art is connected through a pipeline. Multiple valves are scattered on the pipeline. This design has some technical disadvantages such as a complex pipeline layout, high space occupation, and difficult maintenance and assembly, which is not suitable to the vehicle platform design.

SUMMARY

The present disclosure provides an integrated valve module, a vehicle thermal management system, and a vehicle, to solve technical problems existing in the related art.

In order to achieve the above objective, the present disclosure provides an integrated valve module, which includes a body, an interface, and a valve set.

A first flow channel is disposed in the body. The first flow channel includes a first branch channel. The interface is disposed on the body and configured to be connected with a corresponding thermal management device in a thermal management system, and includes an indoor condenser outlet interface, an outdoor heat exchanger inlet interface, and a first interface of a motor heat exchanger. The valve set is disposed on the body and includes a first electric valve and a second electric valve.

A first port of the first electric valve is connected with the indoor condenser outlet interface. A second port of the second electric valve is connected with the outdoor heat exchanger inlet interface. A third port of the second electric valve is connected with the first interface of the motor heat exchanger.

The first branch channel includes a first opening and a second opening, the first opening being configured to be in communication with a second port of the first electric valve and a third port of the first electric valve, and the second opening being configured to be in communication with a first port of the second electric valve. The second port of the first electric valve or the third port of the first electric valve is in communication with the outdoor heat exchanger inlet interface and the first interface of the motor heat exchanger through the first branch channel.

In an embodiment, the interface further includes an outdoor heat exchanger outlet interface, an indoor evaporator inlet interface, and a second interface of the motor heat exchanger. When one of the first interface of the motor heat exchanger and the second interface of the motor heat exchanger is connected with an inlet of the motor heat exchanger, the other one of the first interface of the motor heat exchanger and the second interface of the motor heat exchanger is connected with an outlet of the motor heat exchanger.

The first flow channel further includes a second branch channel.

The valve set further includes a third electric valve.

The second branch channel includes a third opening, a fourth opening, and a fifth opening, the third opening is configured to be in communication with the outdoor heat exchanger outlet interface, the fourth opening is configured to be in communication with a first port of the third electric valve, and the fifth opening is configured to be in communication with the second interface of the motor heat exchanger. The first port of the third electric valve is in communication with the outdoor heat exchanger outlet interface and the second interface of the motor heat exchanger through the second branch channel, and the second port of the third electric valve is connected with the indoor evaporator inlet interface.

In an embodiment, the interface further includes a gas-liquid separator inlet interface and an indoor evaporator outlet interface.

The first flow channel further includes the third branch channel.

The third branch channel includes a sixth opening, a seventh opening, and an eighth opening, the sixth opening is configured to be in communication with a third port of a third electric valve, the seventh opening is configured to be in communication with the indoor evaporator outlet interface, and the eighth opening is configured to be in communication with the gas-liquid separator inlet interface. The third port of the third electric valve and the indoor evaporator outlet interface are in communication with the gas-liquid separator inlet interface through the third branch channel.

In an embodiment, the integrated valve module further includes a first temperature sensor. A temperature sensor interface in communication with the third branch channel is disposed on the body. The temperature sensor interface is located between the indoor evaporator outlet interface and the gas-liquid separator inlet interface, and a detection terminal of the first temperature sensor extends into the temperature sensor interface and is located in the third branch channel.

In an embodiment, the interface further includes a first interface of a battery pack heat exchanger and a first one-way valve.

The second branch channel includes a ninth opening configured to be in communication with a first port of the first one-way valve, and the first port of the first one-way valve is in communication with the outdoor heat exchanger outlet interface through the second branch channel. A second port of the first one-way valve is connected with the first interface of the battery pack heat exchanger. The first one-way valve is configured to allow a fluid to flow in a direction from the first port of the first one-way valve toward the second port of the first one-way valve.

In an embodiment, the valve set further includes a second one-way valve.

A first port of the second one-way valve is connected with the first interface of the battery pack heat exchanger, and the first branch channel includes a tenth opening configured to be in communication with a second port of the second one-way valve, so that the second port of the second one-way valve is in communication with the first interface of the motor heat exchanger through the first branch channel.

In an embodiment, the interface further includes the gas-liquid separator inlet interface and a second interface of the battery pack heat exchanger. When one of the first interface of the battery pack heat exchanger and the second interface of the battery pack heat exchanger is connected with an inlet of the battery pack heat exchanger, the other one of the first interface of the battery pack heat exchanger and the second interface of the battery pack heat exchanger is connected with an outlet of the battery pack heat exchanger.

The first flow channel further includes the third branch channel.

The valve set further includes an expansion valve and a first switch valve. A first port of the expansion valve is connected with the second port of the first one-way valve and the first port of the second one-way valve. A second port of the expansion valve is connected with the first interface of the battery pack heat exchanger.

A first port of the first switch valve is connected with the second interface of the battery pack heat exchanger, and the third branch channel includes an eleventh opening configured to be in communication with a second port of the first switch valve, so that the second port of the first switch valve is in communication with the gas-liquid separator inlet interface through the third branch channel.

In an embodiment, the interface further includes a compressor outlet interface. The first flow channel further includes a fourth branch channel.

The expansion valve includes a two-way expansion valve. The valve set further includes a second switch valve. A first port of the second switch valve is connected with the compressor outlet interface.

The fourth branch channel includes a twelfth opening, a thirteenth opening, and a fourteenth opening, the twelfth opening is configured to be in communication with a second port of the second switch valve, the thirteenth opening is configured to be in communication with the second interface of the battery pack heat exchanger, and the fourteenth opening is configured to be in communication with the first port of the first switch valve, so that the second port of the second switch valve and the second interface of the battery pack heat exchanger are in communication with the first port of the first switch valve through the fourth branch channel.

In an embodiment, the body includes a first portion and a second portion. The first portion includes a first connecting surface. The second portion includes a second connecting surface. The first connecting surface is connected with the second connecting surface.

At least one groove is disposed on the first connecting surface, and the at least one groove on the first connecting surface and the second connecting surface define the first flow channel, or at least one groove is disposed on the second connecting surface, and the at least one groove on the second connecting surface and the first connecting surface define the first flow channel.

In an embodiment, the first flow channel includes a curved flow channel or a linear flow channel.

In an embodiment, at least one groove is disposed on the first connecting surface, and the at least one groove on the first connecting surface and the second connecting surface define the first flow channel. A plurality of second flow channels are disposed inside the first portion, and the valve set is in communication with a corresponding opening disposed on the first flow channel through the second flow channels.

In an embodiment, the multiple valves are in communication with the corresponding opening arranged/disposed on the first flow channel, and a valve core of a valve in the valve set is in communication with the corresponding opening.

According to another aspect of the present disclosure, a vehicle thermal management system is provided. The system includes the integrated valve module.

According to still another aspect of the present disclosure, a vehicle is provided. The vehicle includes the vehicle thermal management system.

In the integrated valve module provided in the present disclosure, a flow channel, such as the first flow channel, is arranged/disposed inside the body to replace the existing connecting pipeline, which is beneficial to reduce the design of the connecting pipeline in thermal management system. The valve set with multiple valves is integrated on the body, which is convenient for maintenance and disassembly and can effectively reduce a support design used for mounting each valve. In addition, the flow channel design inside the body is also conducive to reducing a weight of the integrated valve module, which is conducive to the lightweight design of the vehicle and can reduce cost and fuel consumption. At the same time, due to reduction of the use of parts, a configured space of the vehicle is facilitated to be reduced. Moreover, the flow channel can be flexibly designed on the body of the integrated valve module, so that position of each valve can also be flexibly selected to adapt to different vehicle configurations, which is conducive to the design of the vehicle platform.

Besides, when the integrated valve module is applicable to the vehicle thermal management system, the integrated valve module is connected with another heat exchange device in thermal management system, which is beneficial to realize a preset thermal management mode of the vehicle thermal management system.

In addition, by setting the first branch channel to fit with the second electric valve, the refrigerant entering the body through the indoor condenser outlet interface can share the first branch channel and respectively enter the outdoor heat exchanger and the motor heat exchanger. Sharing the first branch channel is beneficial to reduce the number of flow channels provided, thereby simplifying the structure of the integrated valve module.

Other features and advantages of the present disclosure will be described in detail in the following detailed description.

BRIEF DESCRIPTION OF THE DRAWINGS

The accompanying drawings provide further understanding of the present disclosure and constitute a part of this specification. The accompanying drawings and the specific implementations below are used together for explaining the present disclosure rather than constituting a limitation to the present disclosure. In the accompanying drawings.

DESCRIPTION OF REFERENCE NUMERALS

Figure 1:
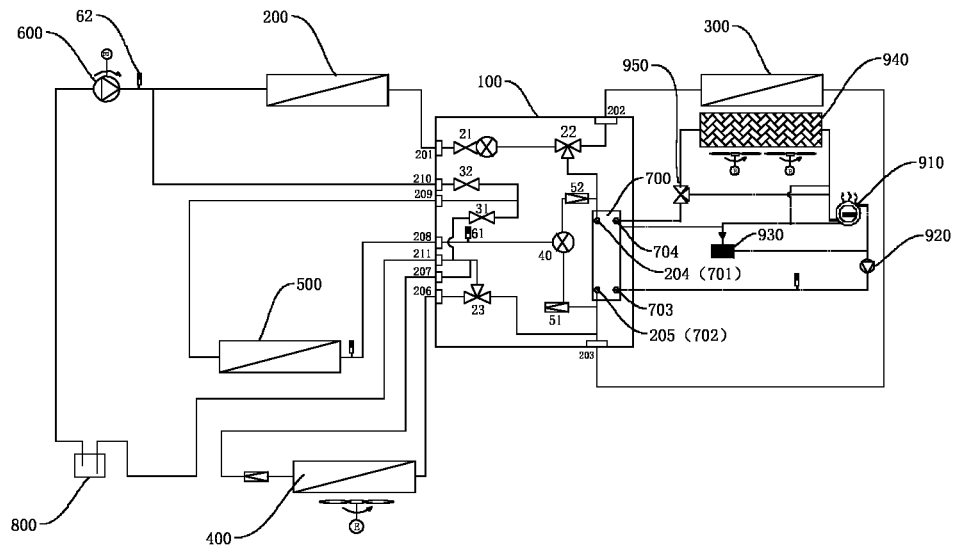
FIG. 1 is a schematic structural diagram of a thermal management system according to an implementation of this application, an integrated valve module being shown.

100: Integrated valve module; 10: Body; 1: First portion; 101: First connecting surface; 102: Water flow tank; 11: First branch channel; 12: Second branch channel; 13: Third branch channel; 14: Fourth branch channel; 15: Fifth branch channel; 2: Second portion; 21: First electric valve; 212: Driving motor; 22: Second electric valve; 221: Valve core of second electric valve; 23: Third electric valve; 231: Valve core of third electric valve; 31: First switch valve; 32: Second switch valve; 40: Expansion valve; 51: First one-way valve; 52: Second one-way valve; 61: First temperature sensor; 62: Second temperature sensor; 201: Indoor condenser outlet interface; 202: Outdoor heat exchanger inlet interface; 203: Outdoor heat exchanger outlet interface; 204: First interface of motor heat exchanger; 205: Second interface of motor heat exchanger; 206: Indoor evaporator inlet interface; 207: Indoor evaporator outlet interface; 208: First interface of battery pack heat exchanger; 209: Second interface of battery pack heat exchanger; 210: Compressor outlet interface; 211: Gas-liquid separator inlet interface; 301: First opening; 302: Second opening; 303: Third opening; 304: Fourth opening; 305: Fifth opening; 306: Sixth opening; 307: Seventh opening; 308: Eighth opening; 309: Ninth opening; 310: Tenth opening; 311: Eleventh opening; 312: Twelfth opening; 313: Thirteenth opening; 314: Fourteenth opening; 315: Temperature sensor interface; 200: Indoor condenser; 300: Outdoor heat exchanger; 400: Indoor evaporator; 500: Battery pack heat exchanger; 600: Compressor; 700: Motor heat exchanger; 701: First port of motor; 702: Second port of motor; 703: Third port of motor; 704: Fourth port of motor; 800: Gas-liquid separator; 910: High voltage system; 920: Water pump; 930: Water supply tank; 940: Heat sink; and 950: Three-way valve.

DETAILED DESCRIPTION

Implementations of the present disclosure are described in detail below with reference to the accompanying drawings. It should be understood that the implementations described herein are merely used to describe and explain the present disclosure, but do not limit the present disclosure.

In the present disclosure, without the contrary explanation, the directional terms "up and down" are defined based on a surface direction of the drawings, "up and down" are the same as directions referred to by the up and down of a vehicle, and "inside and outside" refer to inside and outside o relevant parts. In addition, terms "first", "second" and "third" are only used for distinguishing the description and cannot be understood as indicating or implying relative importance.

In addition, in the description of the present disclosure, it should be noted that, unless otherwise specified or defined, the terms "arrangement", "communication", "installation" should be broadly understood, for example, may be fixed connection, may also be detachable connection or integrated connection; or may be a direct connection, an indirect connection through a middle medium, or interior communication between two elements. A person of ordinary skill in the art may understand the meanings of the foregoing terms in the present disclosure according to situations.

As shown in FIG. 1 to FIG. 15, the present disclosure provides an integrated valve module 100, a vehicle thermal management system including the integrated valve module 100, and a vehicle having the vehicle thermal management system.

As shown in FIG. 1, the vehicle thermal management system may include a thermal management device and an integrated valve module 100. thermal management device may include a compressor 600, an indoor condenser 200, an outdoor heat exchanger 300, an indoor evaporator 400, a gas-liquid separator 800, and the like. The integrated valve module 100 is provided with corresponding interfaces connected to the compressor 600, the indoor condenser 200, the outdoor heat exchanger 300, the indoor evaporator 400, and the gas-liquid separator 800, so as to connect with each thermal management device into various flow paths to realize various preset modes of the vehicle thermal management system, such as an air conditioning refrigeration mode, a battery cooling mode, a battery heating mode, a heat pump heating mode, and an air conditioning dehumidification mode.

Referring to FIG. 1 to FIG. 15, the integrated valve module 100 provided by the present disclosure includes a body 10, an interface, and a valve set. A first flow channel is arranged/disposed in the body 10. The first flow channel includes a first branch channel 1. The interface is arranged/disposed on the body 10 and configured to be connected with a corresponding thermal management device in a thermal management system. The interface includes an indoor condenser outlet interface 201, an outdoor heat exchanger inlet interface 202, and a first interface 204 of a motor heat exchanger. The indoor condenser outlet interface 201 is configured to be connected with an outlet of the indoor condenser 200. The outdoor heat exchanger inlet interface 202 is configured to be connected with an inlet of the outdoor heat exchanger 300. The first interface 204 of the motor heat exchanger is configured to be connected with a first port 701 of the motor heat exchanger 700. The valve set is arranged/disposed on the body 10. The valve set includes a first electric valve 21 and a second electric valve 22. The first electric valve 21 has a throttling function and an unblocking/blocking function. That is, the first electric valve 21 can be used as both a switch valve and an expansion valve.

A first port of the first electric valve 21 is in communication with the indoor condenser outlet interface 201. A second port of the second electric valve 22 is connected to the outdoor heat exchanger inlet interface 202. A third port of the second electric valve 22 is connected to the first interface 204 of the motor heat exchanger. A first opening 301 configured to be in communication with a second port of the first electric valve 21, and a second opening 302 configured to be in communication with a first port of the second electric valve 22, and the first opening 301 and the second opening 302 are arranged/disposed on the first branch channel 11, so that a second port of the first electric valve 21 or a third port of the first electric valve 21 may be in communication with the outdoor heat exchanger inlet interface 202 and the first interface 204 of the motor heat exchanger 700 through the first branch channel 11. As a result, the refrigerant entering the body 10 through the outdoor heat exchanger inlet interface 202 can flow out of the body 10 from the outdoor heat exchanger outlet interface 203 through the first branch channel 11 and the second electric valve 22, or the refrigerant entering the body 10 through the outdoor heat exchanger inlet interface 202 can flow out of the body 10 from the motor heat exchanger first interface 208 through the first branch channel 11 and the second electric valve 22.

For example, when the refrigerant needs to be transferred from the indoor condenser 200 to the outdoor heat exchanger 300, the second port of the first electric valve 21 may be in communication with the first opening 31, the first port may be in communication with the second opening 32 of the second electric valve 22, and the second port in communication with the second electric valve 22 is connected to the outdoor heat exchanger inlet interface 202. In this way, the refrigerant can pass through the indoor condenser outlet interface 201, the first electric valve 21, the first opening 31, the first branch channel 11, the second opening 32, and the second electric valve 21, and enter the outdoor heat exchanger 300.

In the integrated valve module 100 provided in the present disclosure, a flow channel, such as the first flow channel, is arranged/disposed inside the body 10 to replace the existing connecting pipeline, which is beneficial to reduce the design of the connecting pipeline in the thermal management system. The valve set with multiple valves is integrated on the body 10, which is convenient for maintenance and disassembly and can effectively reduce a support design used for mounting each valve. In addition, the flow channel design inside the body 10 is also conducive to reducing a weight of the integrated valve module 100, which is conducive to the lightweight design of the vehicle and can reduce cost and fuel consumption. At the same time, due to reduction of the use of parts, the configured space of the vehicle is facilitated to be reduced. Moreover, the flow channel can be flexibly designed on the body 10 of the integrated valve module 100, so that the position of each valve can also be flexibly selected to adapt to different vehicle configuration, which is conducive to the design of the vehicle platform.

Besides, when the integrated valve module 100 is applied to the vehicle thermal management system, the integrated valve module 100 is connected with another heat exchange device in the thermal management system, which is beneficial to realize a preset thermal management mode of the vehicle thermal management system. For example, after the refrigerant passes through the indoor condenser 200 and before entering the outdoor heat exchanger 300, the refrigerant can absorb heat in the outdoor heat exchanger 300 by a throttling effect of the first electric valve 21, to realize heat exchange with an outdoor environment. In an embodiment, after the refrigerant passes through the indoor condenser 200 and before entering the motor heat exchanger 700, the refrigerant can absorb heat in the motor heat exchanger 700 through the throttling effect of the first electric valve 21, and may realize the recovery of a motor waste heat.

In addition, by setting the first branch channel 11 to fit with the second electric valve 21, the refrigerant entering the body 10 through the indoor condenser outlet interface 201 can share the first branch channel 11 and enter the outdoor heat exchanger 300 and the motor heat exchanger 700. Sharing the first branch channel 11 is beneficial to reduce the number of flow channels provided, thereby simplifying the structure of the integrated valve module 100.

Referring to FIG. 1, FIG. 2, FIG. 7, and FIG. 8, in an embodiment, the interface may further include an outdoor heat exchanger outlet interface 203, an indoor evaporator inlet interface 206, and a second interface 205 of the motor heat exchanger. When one of the first interface 204 of the motor heat exchanger and the second interface 205 of the motor heat exchanger is connected with an inlet of the motor heat exchanger 700 (such as a first port 701 of the motor heat exchanger 700), the other one of the first interface 204 of the motor heat exchanger and the second interface 205 is connected with an outlet of the motor heat exchanger 700 (such as a second port 702 of the motor heat exchanger 700).

The outdoor heat exchanger outlet interface 203 is configured to connect an outlet of the outdoor heat exchanger 300. The indoor evaporator inlet interface 206 is configured to connect an inlet of the indoor evaporator 400. The first flow channel may further include a second branch channel 12. The valve set may further include a third electric valve 23. The third electric valve 23 has a throttling function and an unblocking/blocking function. That is, the third electric valve 23 can be used as both a switch valve and an expansion valve. A third opening 303 configured to be in communication with the outdoor heat exchanger outlet interface 203, a fourth opening 304 configured to be in communication with a first port of the third electric valve 23, and a fifth opening 305 configured to be in communication with the second interface 205 of the motor heat exchanger are arranged/disposed on the second branch channel 12, so that the first port of the third electric valve 23 is in communication with the outdoor heat exchanger outlet interface 203 and the second interface 205 of the motor heat exchanger through the second branch channel 12. The second port of the third electric valve 23 is connected with the indoor evaporator inlet interface 206, so that the refrigerant flowing into the body 10 through the outdoor heat exchanger outlet interface 203 or the refrigerant entering the body 10 through the compressor outlet interface 210 can flow out of the body 10 from the indoor evaporator inlet interface 206 through the second flow channel 12.

Based on the above, the refrigerant entering the body 10 through the outdoor heat exchanger outlet interface 203 and the refrigerant entering the body 10 through the second interface 205 of the motor heat exchanger can share the second branch channel 12 and flow into the indoor evaporator 400. Sharing the second branch channel 11 is beneficial to reduce the number of flow channels provided, thereby simplifying the structure of the integrated valve module 100.

In an embodiment, for example, when the refrigerant needs to enter the indoor evaporator 400 from the outdoor heat exchanger 300, the first port may be in communication with a fourth opening 304 of the third electric valve 23, and the second port of the third electric valve 23 may be in communication with the indoor evaporator inlet interface 206. In this way, the refrigerant can pass through the outdoor heat exchanger outlet interface 203, the third opening 303, the second branch channel 11, the fourth opening 304, the first port of the third electric valve 23 and the second port of the third electric valve 23, and enter the indoor evaporator 400 through the indoor evaporator inlet interface 206.

When the refrigerant needs to enter the indoor evaporator 400 from the motor heat exchanger 700, the first port may be in communication with a fifth opening 305 of the third electric valve 23, and the second port of the third electric valve 23 may be in communication with the indoor evaporator inlet interface 206. In this way, the refrigerant can pass through the second interface 205 of the motor heat exchanger, the fifth opening 305, the second branch channel 11, the fourth opening 304, the first port of the third electric valve 23 and the second port of the third electric valve 23 and enter the indoor evaporator 400 through the indoor evaporator inlet interface 206.

Moreover, since the third electric valve 23 can be used as an expansion valve, the refrigerant entering the body 10 through the outdoor heat exchanger outlet interface 203 can be throttled, so that a low-temperature and low-pressure refrigerant enters the indoor evaporator 400 to evaporate and absorb heat, which is beneficial to realize the air conditioning refrigeration mode and the air conditioning dehumidification mode.

Referring to FIG. 1, FIG. 2, FIG. 5, and FIG. 8, in an embodiment, the interface may further include a gas-liquid separator inlet interface 211 and an indoor evaporator outlet interface 207. The gas-liquid separator inlet interface 211 is configured to be connected with an inlet of the gas-liquid separator 800. The indoor evaporator outlet interface 207 is configured to be connected with an outlet of the indoor evaporator 400.

The first flow channel may further include a third branch channel 13. A sixth opening 306 configured to be in communication with a third port of the third electric valve 23, a seventh opening 307 configured to be in communication with the indoor evaporator outlet interface 207, and an eighth opening 308 configured to be in communication with the gas-liquid separator inlet interface 211 are arranged/disposed on the third branch channel 13, so that the third port of the third electric valve 23 and the indoor evaporator outlet interface 207 are both in communication with the gas-liquid separator inlet interface 211 through the third branch channel 13, the refrigerant entering the body 10 through the indoor evaporator outlet interface 207 can flow out of the body 10 from the gas-liquid separator inlet interface 211 through the third flow channel 13, or the refrigerant entering the body 10 through the outdoor heat exchanger outlet interface 203 can flow out of the body 10 from the gas-liquid separator inlet interface 211 through the third flow channel 13.

Based on the above, the refrigerant entering the body 10 through the indoor evaporator outlet interface 207 and the refrigerant flowing through the third port of the third electric valve 23 can share the third branch channel 13 and flow out to the gas-liquid separator inlet interface 211, thereby flowing out of the body 10. Sharing the third branch channel 13 is beneficial to reduce the number of flow channels provided, thereby simplifying the structure of the integrated valve module 100.

In addition, in conjunction with the above solution, the refrigerant flowing out from the third port of the third electric valve 23 can flow out of the gas-liquid separator 800 through the gas-liquid separator inlet interface 211, therefore the vehicle thermal management system can have the air conditioning refrigeration mode through fitting of the first electric valve 21, the second electric valve 22, and the third electric valve 23. In this mode, a high-temperature and high-pressure gaseous refrigerant discharged from the compressor 600 passes through the indoor condenser 200 (exothermic operation may not be performed in this case), and enters the body 10 through the indoor condenser outlet interface 201 on the body 10, and then the refrigerant may sequentially through the first electric valve 21, the first branch channel 11, and the second electric valve 22 and enter the outdoor heat exchanger 300. In this case, the first electric valve 21 may be configured as a switch valve and is in an open state. The refrigerant may enter the third electric valve 23 through the second branch channel 12 after heat is dissipated by the outdoor heat exchanger 300. In this case, the third electric valve 23 functions as an expansion valve, and performs throttling-induced pressure reduction on the refrigerant to vaporize the refrigerant. The vaporized refrigerant enters an indoor evaporator 400. After being vaporized and cooled in the indoor evaporator 400, the refrigerant flows into the gas-liquid separator 800 from the gas-liquid separator inlet interface 211 through the third branch channel 13, and finally flows back to the compressor 600 to complete an air-conditioning refrigeration.

Figure 2:
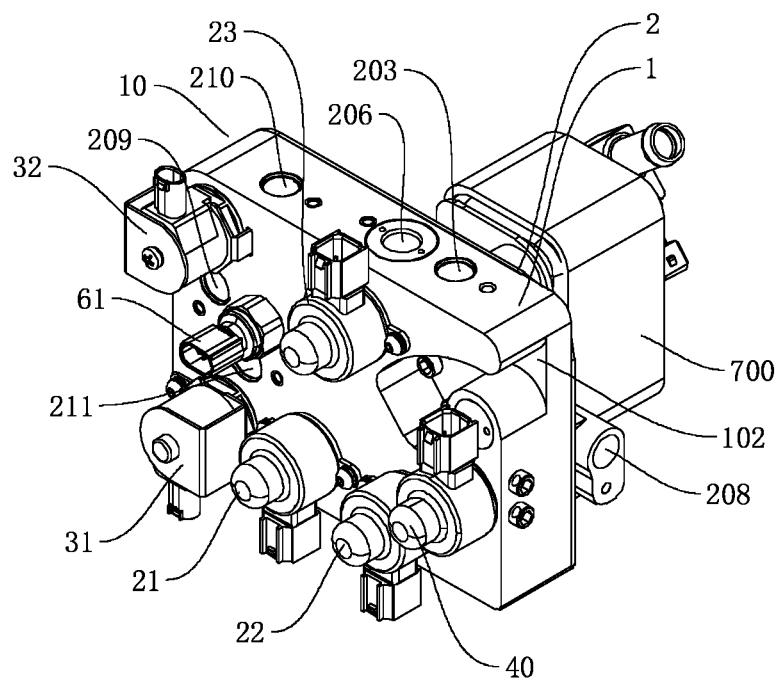
FIG. 2 is a three-dimensional schematic diagram of an integrated valve module according to an implementation of the present disclosure.
Figure 3:
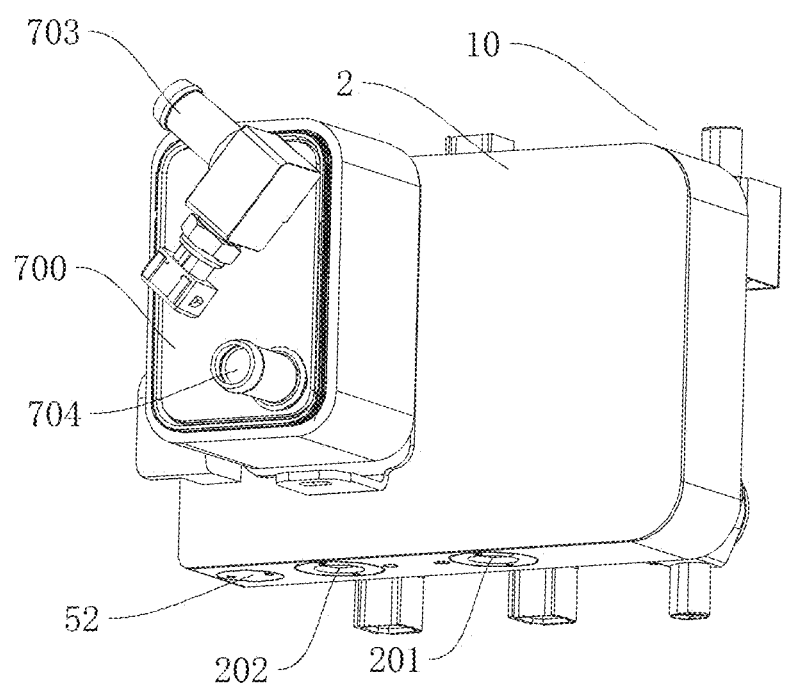
FIG. 3 is a three-dimensional schematic diagram of an integrated valve module from another perspective according to an implementation of the present disclosure.
Figure 8:
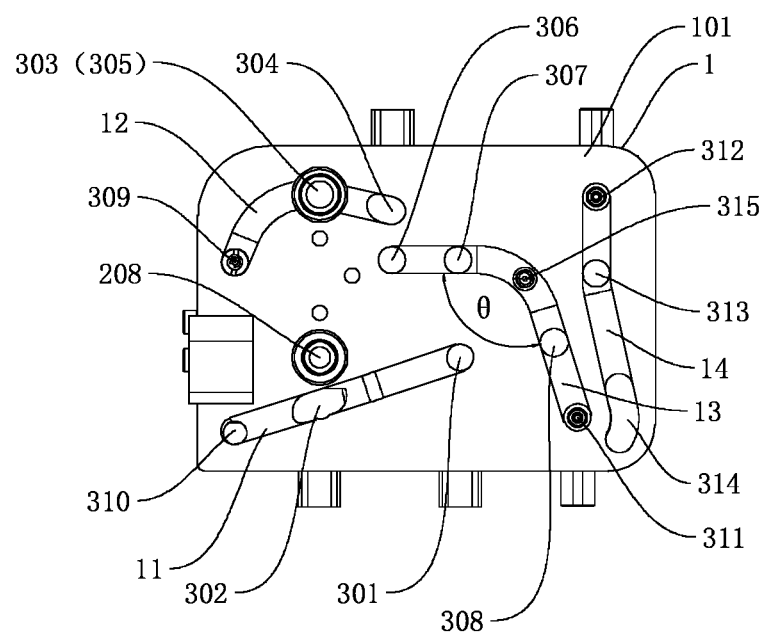
FIG. 8 is a schematic diagram of a configuration of a first flow channel of an integrated valve module according to an implementation of this application.
Figure 9:
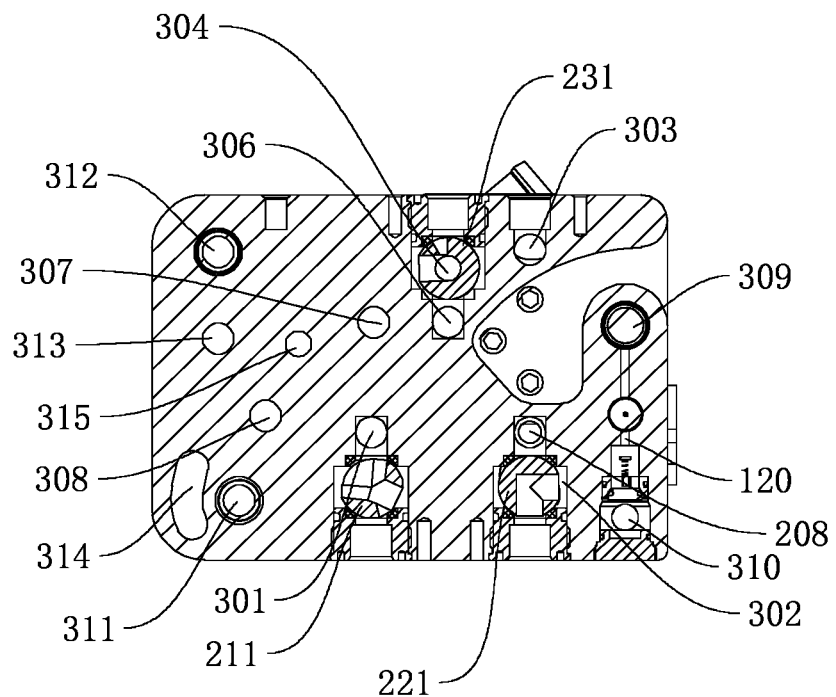
FIG. 9 is a cross-sectional view taken along line A-A in FIG. 6.
Figure 10:
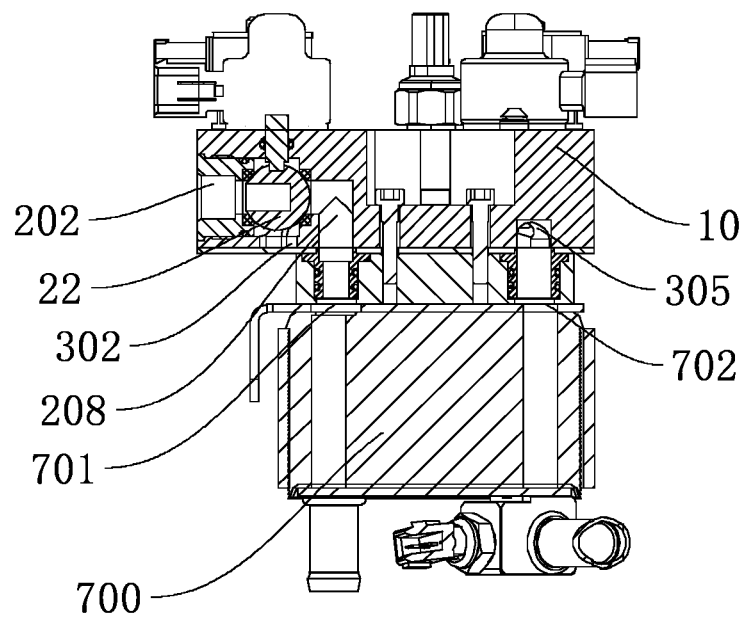
FIG. 10 is a cross-sectional view taken along line B-B in FIG. 6.
Figure 11:
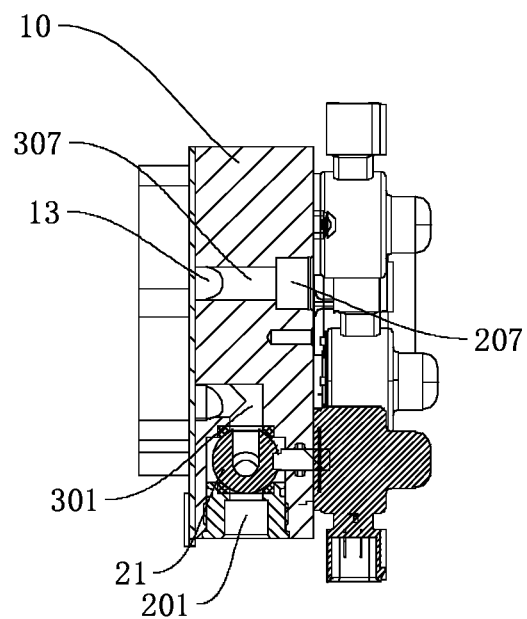
FIG. 11 is a cross-sectional view taken along line C-C in FIG. 5.
Figure 12:
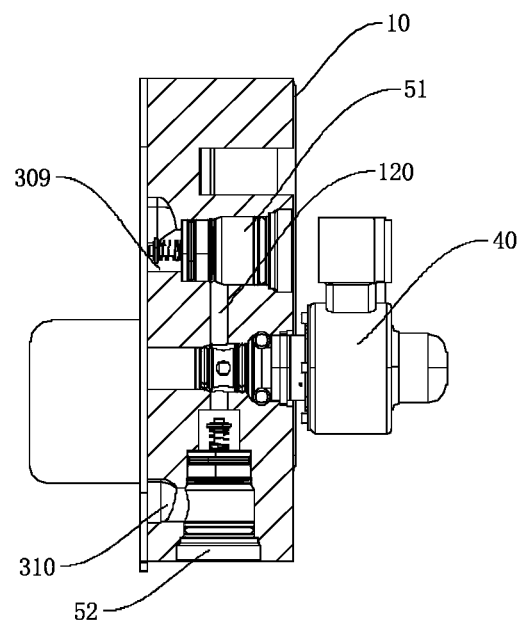
FIG. 12 is a cross-sectional view taken along line D-D in FIG. 5.
Figure 13:
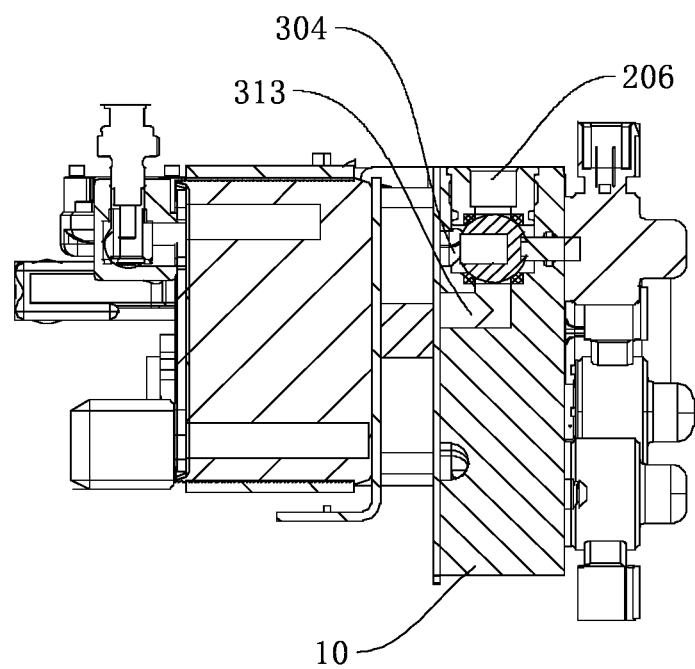
FIG. 13 is a cross-sectional view taken along line E-E in FIG. 5.
Figure 14:
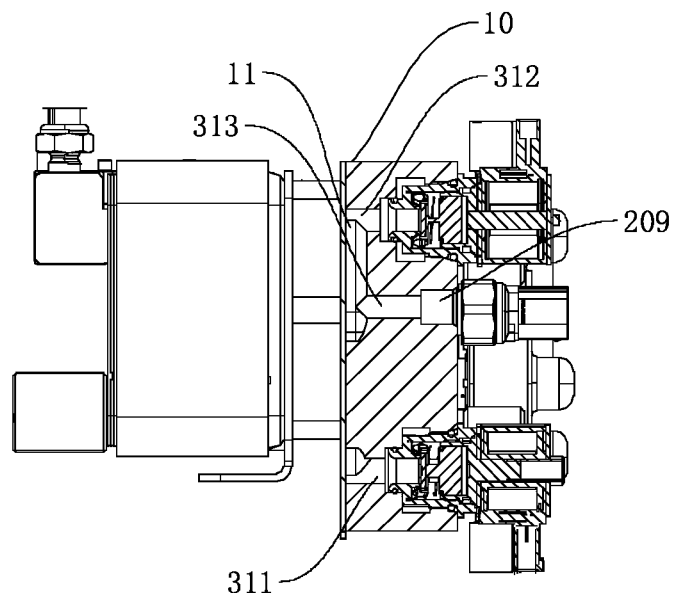
FIG. 14 is a cross-sectional view taken along line F-F in FIG. 5.
Figure 15:
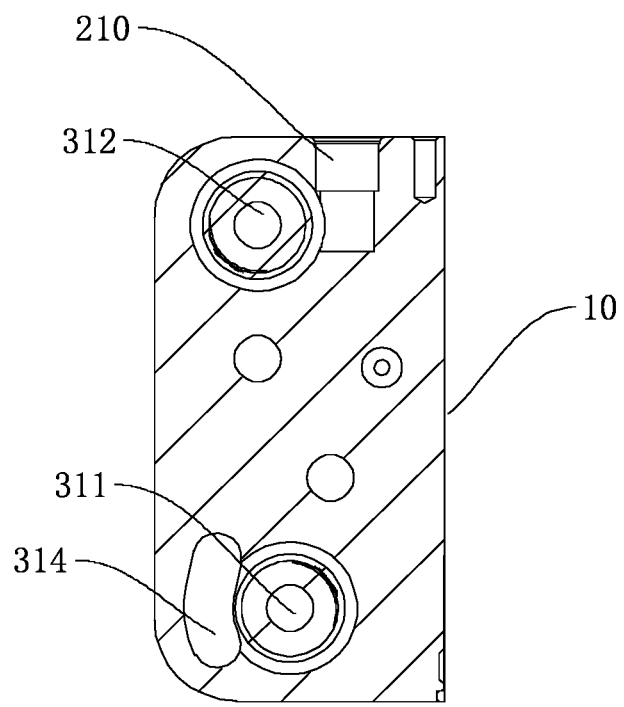
FIG. 15 is a cross-sectional view taken along line G-G in FIG. 7.

Referring to FIG. 1, FIG. 2, and FIG. 8, in an embodiment, the integrated valve module may further include a first temperature sensor 60. A temperature sensor interface 315 in communication with the third branch channel 13 is further arranged/disposed on the body 10. The temperature sensor interface 315 is located between the indoor evaporator outlet interface 207 and the gas-liquid separator inlet interface 211. A detection terminal of the first temperature sensor 60 extends into the temperature sensor interface 315 and is located in the third branch channel 13. The first temperature sensor 60 is configured to monitor a temperature of a cooling fluid flowing from the outlet of the indoor evaporator 400. In an embodiment, when the temperature sensor 60 detects that the temperature of the cooling liquid flowing out from the outlet of the indoor evaporator 400 is excessively high or excessively low, a flow rate of the third electric valve 23 may be correspondingly adjusted. The first temperature sensor 60 may be a PT sensor.

Figure 6:
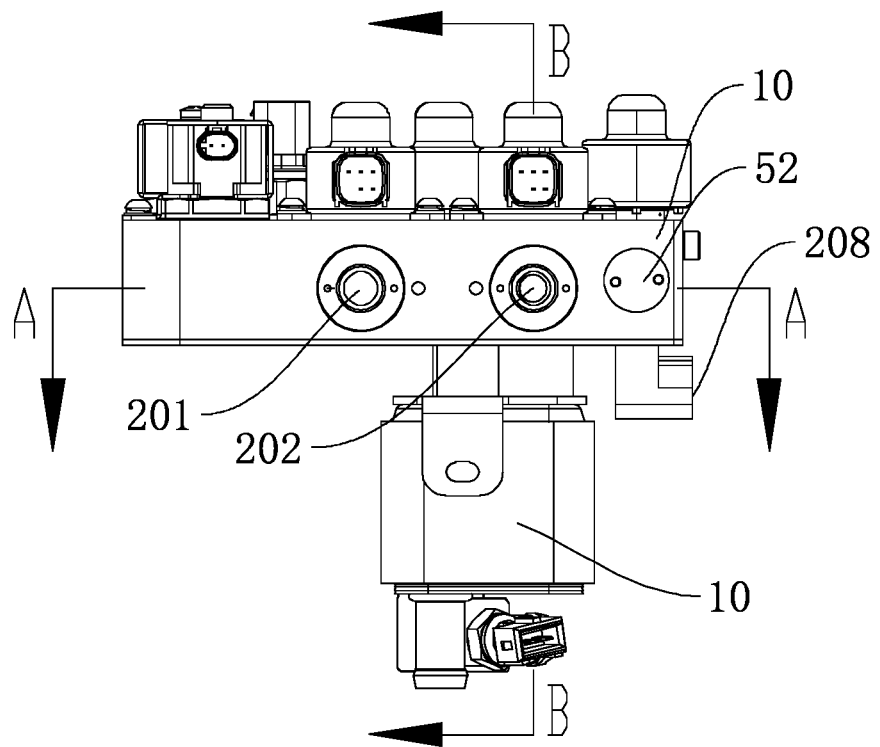
FIG. 6 is a schematic bottom view of an integrated valve module according to an implementation of the present disclosure.
Figure 7:
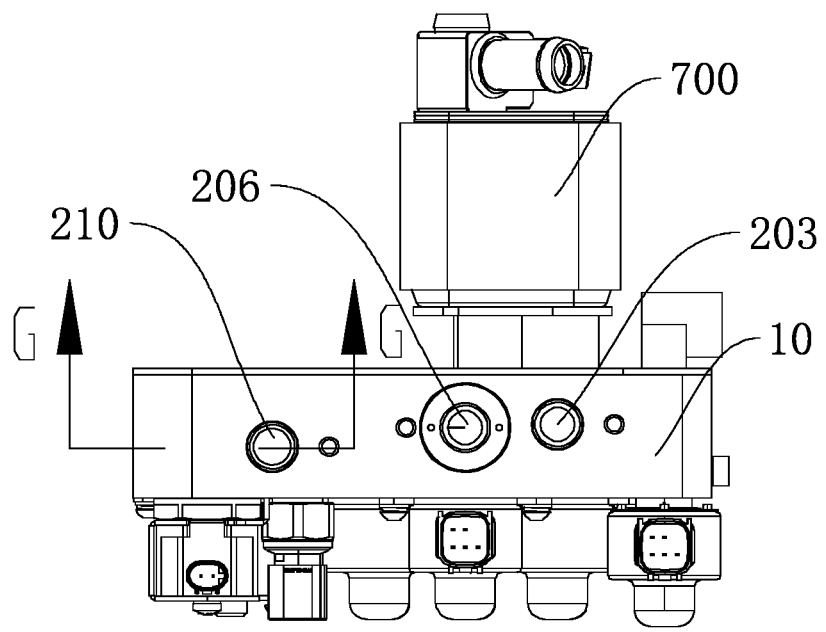
FIG. 7 is a schematic top view of an integrated valve module according to an implementation of the present disclosure.

Referring to FIG. 1, FIG. 6, and FIG. 8, the interface may further include a first interface 208 of a battery pack heat exchanger and a first one-way valve 51. A ninth opening 309 configured to be in communication with a first port of the first one-way valve 51 is further arranged/disposed on the second branch channel 12, so that the first port of the first one-way valve 51 is in communication with the outdoor heat exchanger outlet interface 203 through the second branch channel 12. A second port of the first one-way valve 51 is connected with the first interface 208 of the battery pack heat exchanger. The first one-way valve 51 is configured to allow a fluid to flow in a direction from the first port toward the second port of the first one-way valve, so that the refrigerant entering the body 10 from an outdoor heat exchanger outlet interface 203 can flow out of the body 10 from the first interface 208 of the battery pack heat exchanger through the second flow channel 12.

As shown in FIG. 1 and FIG. 8, in this implementation, the refrigerant entering the body 10 through the outdoor heat exchanger outlet interface 203 can flow into the first one-way valve 51 through the second branch channel 12, and passes through the first interface 208 of the battery pack heat exchanger and enter the battery pack heat exchanger 500 through the first one-way valve 51, to realize heat exchange with the battery pack heat exchanger 500. Besides, a first port inlet of the first one-way valve 51 are also in communication with the outdoor heat exchanger outlet interface 203 by using the second branch channel 12, which is further beneficial to reduce the number of flow channels provided, thereby simplifying the structure of the integrated valve module 100.

Referring to FIG. 1 and FIG. 8, in an embodiment, the valve set further includes a second one-way valve 52. A first port of the second one-way valve 52 is connected with the first interface 208 of the battery pack heat exchanger, and a tenth opening 310 configured to be in communication with a second port of the second one-way valve 52 is arranged/disposed on the first branch channel 11, so that the second port of the second one-way valve 52 is in communication with the first interface 204 of the motor heat exchanger through the first branch channel 11. Therefore, the refrigerant entering the body 10 through the first interface 208 of the battery pack heat exchanger can flow out of the body 10 from the first interface of the motor heat exchanger through the first branch channel 11. Besides, a second port outlet of the second one-way valve 52 and the first interface 204 of the motor heat exchanger are also in communication with the first branch channel 11, which is further beneficial to reduce the number of flow channels provided, thereby simplifying the structure of the integrated valve module 100.

Referring to FIG. 1, FIG. 2, FIG. 8, and FIG. 9, in an embodiment, the interface may further include a second interface 209 of the battery pack heat exchanger. When one of the first interface 208 of the battery pack heat exchanger and the second interface 209 of the battery pack heat exchanger is connected with an inlet of the battery pack heat exchanger 500, the other one of the first interface 208 of the battery pack heat exchanger and the second interface 209 of the battery pack heat exchanger is connected with an outlet of the battery pack heat exchanger 500. The valve set may further include an expansion valve 40 and a first switch valve 31. A first port of the expansion valve 40 is in communication with the second port of the first one-way valve 51 and the first port of the second one-way valve 52. A second port of the expansion valve 40 is connected with the first interface 208 of the battery pack heat exchanger. A first port of the first switch valve 31 is connected with the second interface 209 of the battery pack heat exchanger. An eleventh opening 311 configured to be in communication with a second port of the first switch valve 31 is further arranged/disposed on the third branch channel 13, so that the second port of the first switch valve 31 is in communication with the gas-liquid separator inlet interface 21 through the third branch channel 13, and the refrigerant flowing into the body 10 through the second interface 209 of the battery pack heat exchanger can flow out of the body 10 from the gas-liquid separator inlet interface 211 through the third flow channel 13. In this implementation, the second port of the first switch valve 31 are also in communication with the gas-liquid separator inlet interface 211 by the third branch channel 13, which is further beneficial to reduce the number of flow channels provided, thereby simplifying the structure of the integrated valve module 100.

In addition, in conjunction with the above solution, the battery cooling mode can also be realized by fitting of the first electric valve 21, the second electric valve 22, and the expansion valve 40. In this mode, a high-temperature and high-pressure gaseous refrigerant discharged from the compressor 600 passes through the indoor condenser 200 (the indoor condenser may not perform exothermic operation in this case), and enters the body 10 through the indoor condenser outlet interface 201 on the body 10, and then the refrigerant may sequentially through the first electric valve 21, the first branch channel 11, and the second electric valve 22 and enter the outdoor heat exchanger 300. In this case, the first electric valve 21 may be configured as a switch valve and is in an open state. The refrigerant may enter the first one-way valve 51 through the second branch channel 12 after heat is dissipated by the outdoor heat exchanger 300. And then the refrigerant passes through the expansion valve 40, and the expansion valve 40 performs throttling-induced pressure reduction on the refrigerant to vaporize the refrigerant. The vaporized refrigerant enters the battery pack heat exchanger 500 through the first interface 208 of the battery pack heat exchanger on the body 10 to cool the battery pack. A coolant coming out through the battery pack heat exchanger 500 may enter the body 10 through the second interface 209 of the battery pack heat exchanger, pass through the first switch valve 31, and then flow into the gas-liquid separator 800 from the gas-liquid separator inlet interface 211 through the third branch channel 13, and finally flow back to the compressor 600 to complete a battery cooling mode.

Referring to FIG. 1, FIG. 2, and FIG. 8, the interface may further include a compressor outlet interface 210. The first flow channel further includes a fourth branch channel 14. The expansion valve 40 is a two-way expansion valve. The valve set further includes a second switch valve 32. A first port of the second switch valve 32 is connected with the compressor outlet interface 210. A thirteenth opening 313 configured to be in communication with a second port of the second switch valve 32, a fourteenth opening 314 configured to be in communication with the second interface 209 of the battery pack heat exchanger, and a fifteenth opening configured to be in communication with the first port of the first switch valve 31 are further arranged/disposed on the fourth branch channel 14, so that the second port of the second switch valve 32 and the second interface 209 of the battery pack heat exchanger 500 are both in communication with the first port of the first switch valve 31 through the fourth branch channel 14, the refrigerant entering the body 10 through the indoor condenser outlet interface 201 can flow out of the body 10 from the second interface 209 of the battery pack heat exchanger through the fourth branch channel 14, or the refrigerant entering the body 10 through the fourth branch channel of the second interface 209 of the battery pack heat exchanger can flow out of the body 10 from the gas-liquid separator inlet interface 211.

In this implementation, the fourth branch channel 14 is shared between the second interface 209 of the battery pack heat exchanger and the first switch valve 31, and between the second switch valve 32 and the second interface 209 of the battery pack heat exchanger, which is beneficial to reduce the number of flow channels provided, thereby simplifying the structure of the integrated valve module 100.

In addition, in conjunction with the above solution, the battery heating mode can also be realized by fitting of the second switch valve 32, the expansion valve 40, and the third electric valve 23. In this mode, the high-temperature and high-pressure gaseous refrigerant discharged from the compressor 600 enters the battery pack heat exchanger 500 as an inlet through the second switch valve 32 and the fourth branch channel 14 from the second interface 209 of the battery pack heat exchanger, and heats a battery. The refrigerant flowing from the battery pack heat exchanger 500 may enter the body 10 through the first interface 208 of the battery pack heat exchanger, and then enter the third electric valve 23 through the second branch channel 12. In this case, the third electric valve 23 functions as a switch valve and is in an open state, so that the refrigerant flows into the gas-liquid separator 800 from the gas-liquid separator inlet interface 211 through the third branch channel 13, and finally flows back to the compressor 600 to complete a battery heating mode.

In the present disclosure, the first branch channel 11, the second branch channel 12, the third branch channel 13, and the fourth branch channel 14 of the first flow channel may be substantially located in a same plane. By configuring the first flow channel in the same plane, manufacturing processing and later maintenance are facilitated.

It may be understood that, in the present disclosure, in addition to the first flow channel, the body 10 is also provided with other flow channels to communicate the external heat exchange device and the valve set with the first flow channel.

The present disclosure does not limit a specific structure of the body 10. In an embodiment, referring to FIG. 2, the body 10 may include a first portion 1 and a second portion 2. The first portion 1 includes a first connecting surface 101. The second portion 2 include a second connecting surface. The first connecting surface 101 is hermetically connected with the second connecting surface. At least one groove is arranged/disposed on the first connecting surface 101, and the at least one groove on the first connecting surface 101 and the second connecting surface jointly define the first flow channel. When the first portion 1 and the second portion 2 are bonded together, the second connecting surface of the second portion 2 is covered on the groove of the first connecting surface 101 of the first portion 1, and a part of the second connecting surface covering the opening of the groove defines the first flow channel with a groove wall of the groove.

In an embodiment, at least one groove is arranged/disposed on the second connecting surface 104, and the groove on the second connecting surface 104 and the first connecting surface 101 jointly define the first flow channel. When the first portion 1 and the second portion 2 are bonded together, the first connecting surface of the first portion 1 is covered on the groove of the second connecting surface 104 of the second portion 2, and a part of the first connecting surface 101 covering the opening of the groove defines the first flow channel with a groove wall of the groove.

In an embodiment, at least one groove is arranged/disposed on the first connecting surface 101. The groove on the first connecting surface 101 and the second connecting surface 104 jointly define the first flow channel. Multiple second flow channels 120 are arranged/disposed inside the first portion 1. The valve set or the external heat exchanger device may be in communication with a corresponding opening provided on the first flow channel through the second flow channel 120.

It may be understood that the second flow channel here refers to the internal flow channel on the first portion 1. For example, referring to FIG. 12, the first port of the expansion valve 40 may be in communication with the first port of the second one-way valve 51 through a second flow channel 120.

In some implementations of the present disclosure, the valve set including multiple valves is in communication with the corresponding opening arranged/disposed on the first flow channel, and a valve core of a valve in the valve set is in direct communication with the corresponding opening. That is, after the valve is mounted to the body 10, the port on the valve core can directly correspond to the opening on the first flow channel, so as to save the flow channel between the port on the valve core and the corresponding opening.

In order to adapt to different mounting scenarios, in an implementation provided by the present disclosure, the groove may be a curved groove or a linear groove, so that the first flow channel is a linear flow channel or a curved flow channel.

In a case that the groove is the curved groove, in order to reduce a resistance of a fluid flowing in the first flow channel 110, an included angle θ of the curved groove at a curved position may be in a range of 50° and 180°. In this way, during the flow of the fluid in the groove, a small flow resistance exists between the fluid and the groove, so that flow of the fluid in the groove is smooth and energy consumption of the fluid in the flow process is reduced. Preferably, the included angle θ may be in a range of 110° and 180°.

In an embodiment, the cross section of the groove is a U-shaped having a smooth transition. On the one hand, the U-shaped groove is more convenient for processing; on the other hand, the smooth transition groove can also cause the flow resistance of the fluid in the process of flowing in the groove small, so that the fluid flows more smoothly in the first flow channel.

In an embodiment, as shown in FIG. 2, a water flow tank 102 may also be arranged/disposed on the first portion 1. The water flow tank 102 can guide the accumulated water in a screw hole for connecting the motor heat exchanger 700 to the body 10.

In order to facilitate the mounting of each valve and the related parts, referring to FIG. 1 to FIG. 7, multiple insertion holes may be arranged/disposed on the body 10. The first electric valve 21, the third electric valve 22, the third electric valve 23, the first switch valve 31, the second switch valve 32, the expansion valve 40, the first one-way valve 51, and the second one-way valve 52 may be inserted into the corresponding insertion holes.

The first switch valve 31 and the second switch valve 32 are connected with the corresponding insertion holes having thread on the body 10. In addition, as shown in FIG. 5, mounting positions of the first switch valve 31 and the second switch valve 32 may be designed to the same side, so as to shorten a flow channel between the outlet of the second switch valve 32 and the inlet of the first switch valve 31, avoid formation of corners in the flow channel, and have low flow resistance performance.

Figure 4:
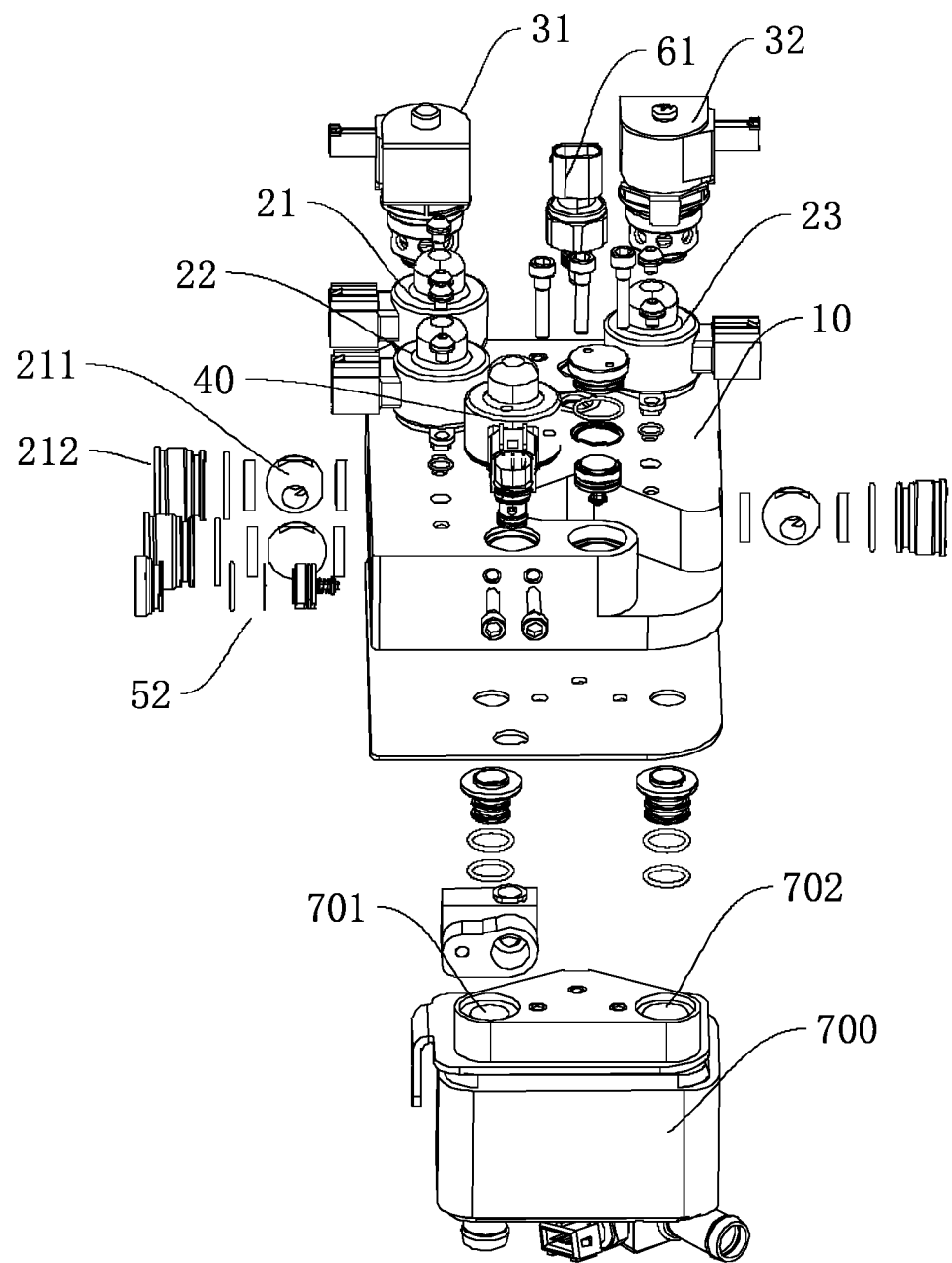
FIG. 4 is an explosive schematic diagram of an integrated valve module according to an implementation of the present disclosure.
Figure 5:
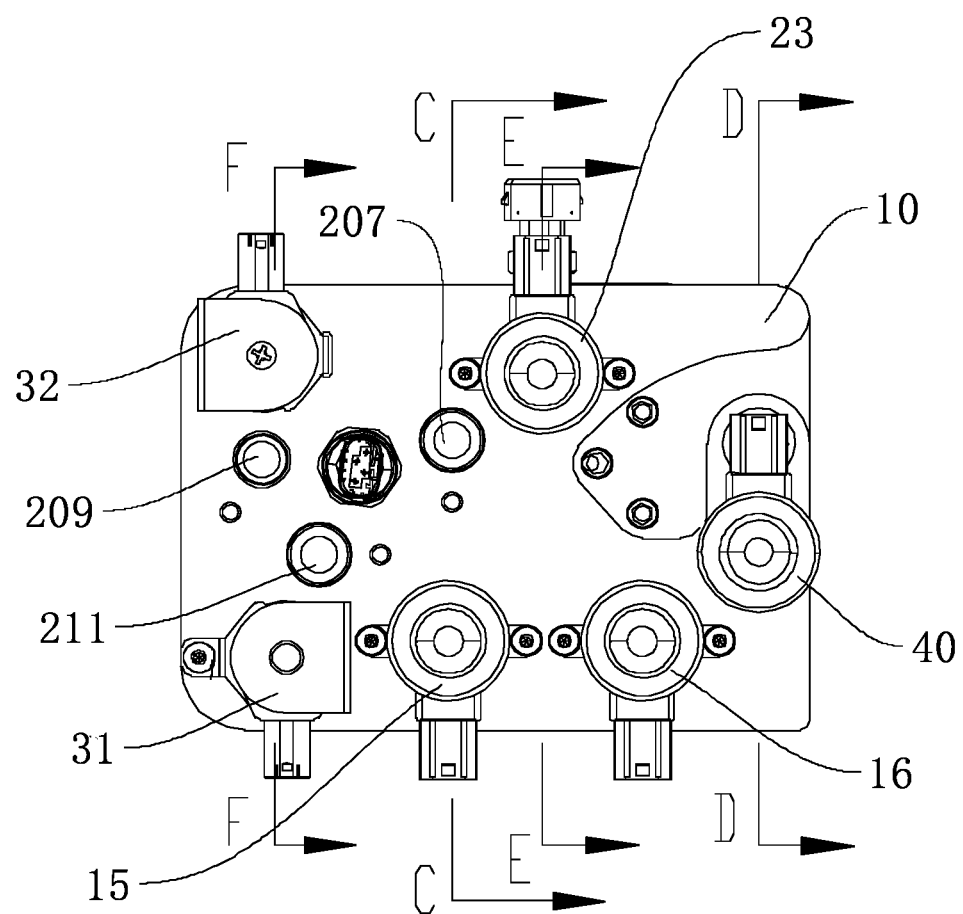
FIG. 5 is a schematic front view of an integrated valve module according to an implementation of the present disclosure.

Referring to FIG. 4 and FIG. 5, the respective valve cores of the first electric valve 21, the second electric valve 22, and the third electric valve 23 are inserted into the corresponding insertion ports on the body 10, and are fixed to the body 10 through pins with threads on ends. In an embodiment, a valve core of the first electric valve 21, a valve core of the third electric valve 22, and a valve core of the third electric valve are respectively assembled and connected to a sealing block, and are connected to the corresponding insertion holes through a threaded adjustment base. An execution motor is connected with the corresponding valve core and fixedly connected with the body through the screw.

The first one-way valve 51 and the second check valve 52 are provided with external threads, and the corresponding insertion holes on the body 10 are provided with internal threads. In this way, the first one-way valve 51 and the second one-way valve 52 may be threaded and connected to the corresponding insertion holes, and are fixed through circlips, and are sealed through plugs.

In the present disclosure, the motor heat exchanger 700 may be mated and connected by a connecting joint welded on the body 10, and is sealed and fastened with screws by using an O-ring.

In the present disclosure, the first electric valve 21, the second electric valve 22, and the third electric valve 23 are each provided with corresponding driving motors, so as to realize precise control of flow and cut-off of flow by driving the valve core to rotate through the driving motor, and achieve switching of each function of the thermal management system. As shown in FIG. 4, the first electric valve 21 is used as an example. Rotation of the valve core of the first electric valve is driven by a driving motor 212, and the first port of the first electric valve 21 may be selectively in communication with the second port of the first electric valve 21, or the first port of the first electric valve 21 may be selectively in communication with the third port of the first electric valve.

Referring to FIG. 1, in an embodiment, the vehicle thermal management system may further include a second temperature sensor 62. The second temperature sensor 62 may be configured for a temperature of a refrigerant at an outlet of the compressor 600. The second temperature sensor 62 may be a PT sensor.

Referring to FIG. 1, in an embodiment, the vehicle thermal management system may further include a high voltage system 910 of a motor, a pump 920, a water supply tank 930, a heat sink 940, and a three-way valve 950. The high voltage system 910, the pump 920, the water supply tank 930, the heat sink 940, and the three-way valve 950 may be connected to a motor to form a coolant flow path.

A first port of the three-way valve 950 is connected to the fourth opening 704 of the motor heat exchanger 700, a second port of the three-way valve 950 is connected to an inlet of the heat sink 940, and a third port of the three-way valve 950 is configured to be connected to an inlet of the high voltage system 910. In this implementation, the coolant passing through the three-way valve 950 may be divided into two paths, with one of the two paths entering the heat sink 940, and the other of the two paths entering the high voltage system 910 having a motor, an electronic control, and the like, and the heat in the high voltage system 910 being brought into the motor heat exchanger 700 to exchange heat with the refrigerant circuit.

The operating process of multiple typical operating modes of the vehicle thermal management system according to an implementation of the present disclosure is described in detail below in conjunction with the accompanying drawings.

Eleven operating modes of the vehicle thermal management system of an air conditioning refrigeration mode, a heat pump heating mode, a battery heating mode, a battery cooling mode, an air conditioning refrigeration and battery cooling dual mode, a mode enabling both air conditioning refrigeration and battery cooling, a mode enabling both air conditioning refrigeration and battery heating, a mode enabling both heat pump heating and battery heating, a mode enabling both heat pump heating and battery cooling, a mode enabling both air conditioning refrigeration and air conditioning and heating dehumidification, a mode enabling air conditioning refrigeration, air conditioning and heating dehumidification, and battery cooling, and a mode enabling air conditioning refrigeration, air conditioning and heating dehumidification, and battery heating are introduced in detail.

1. Air Conditioning Refrigeration Mode

Referring to FIG. 1, in this mode, a main flow path of the refrigerant is: compressor 600→indoor condenser 200→first electric valve 21→second electric valve 22→outdoor heat exchanger 300→third electric valve 23→indoor evaporator 400→gas-liquid separator 800→compressor 600. It should be noted that, in this mode, although the refrigerant flowing out of the outlet of the compressor 600 flows through the indoor condenser 200, the indoor condenser 200 may not be blown by a fan or a blower, so that the high-temperature and high-pressure refrigerant flowing into the indoor condenser 200 is not exothermally condensed in the indoor condenser 200. That is to say, in this mode, the indoor condenser 200 functions as a through flow channel.

Referring to FIG. 1 to FIG. 9, in conjunction with the integrated valve module 100 provided in the present disclosure, an example flow path of the refrigerant is: compressor 600→indoor condenser 200→indoor condenser outlet interface 201→first port of first electric valve 21→second port of first electric valve 21→first opening 301→first branch channel 1111→second opening 302→first port of second electric valve 22→second port of second electric valve 22→outdoor heat exchanger inlet interface 202→outdoor heat exchanger 300→outdoor heat exchanger outlet interface 203→third opening 303→second branch channel 12→fourth opening 304→first port of third electric valve 23→second port of third electric valve 23→indoor evaporator inlet interface 206→indoor evaporator 400→indoor evaporator outlet interface 207→seventh opening 307→third branch channel 13→eighth opening 308→gas-liquid separator inlet interface 211→gas-liquid separator 800→compressor 600.

In this mode, the first port of the first electric valve 21 is in communication with the second port of the first electric valve 21, and the first electric valve 21 functions as the switch valve, and the refrigerant is not throttled. The first port of the third electric valve 23 is in communication with the second port of the third electric valve 23. The third electric valve 23 functions an expansion valve to perform throttling-induced pressure reduction on the refrigerant, so that the low-temperature and low-pressure refrigerant can evaporate and absorb heat in the indoor evaporator 400, thereby realizing control of the refrigeration mode. The first electric valve 21 and the second electric valve 22 drive the valve core of the corresponding electric valve through the respective driving motors, and can switch the connected ports.

In addition, connection between the compressor 600 and the indoor condenser 200, between the compressor 600 and the gas-liquid separator 800, and between each interface of the integrated valve module 100 and the corresponding heat exchange device can be connected by pipelines.

2. Heat Pump Heating Mode

Referring to FIG. 1, in this mode, a main flow path of the refrigerant is: compressor 600→indoor condenser 200→first electric valve 21→second electric valve 22→motor heat exchanger 700→third electric valve 23→gas-liquid separator→compressor 600. In this mode, the refrigerant flowing out of the outlet of the compressor 600 releases heat in the indoor condenser 200, and the indoor condenser 200 releases heat and combines with the wind heating PTC to heat the vehicle.

Referring to FIG. 1 to FIG. 9, in conjunction with the integrated valve module 100 provided in the present disclosure, an example flow path of the refrigerant is: compressor 600→indoor condenser 200→indoor condenser outlet interface 201→first port of first electric valve 21→third port of first electric valve 21→first opening 301→first branch channel 11→second opening 302→first port of second electric valve 22→third port of second electric valve 22→first interface 204 of motor heat exchanger→motor heat exchanger 700→second interface 205 of motor heat exchanger→fifth opening 305→second branch channel 12→fourth opening 304→first port of third electric valve 23→third port of third electric valve 23→sixth opening 306→third branch channel 13→eighth opening 308→gas-liquid separator inlet interface 211→gas-liquid separator 800→compressor 600.

In this mode, the first port of the first electric valve 21 is in communication with the third port of the first electric valve 21, and the first electric valve 21 functions as an expansion valve to throttle the refrigerant, so that the low-temperature and low-pressure refrigerant can evaporate and absorb heat in the motor heat exchanger 700. The first port of the third electric valve 23 is in communication with the third port of the third electric valve 23, and the third electric valve 23 functions as a switch valve.

3. Battery Cooling Mode:

Referring to FIG. 1, in this mode, a main flow path of the refrigerant is: compressor 600→indoor condenser 200→first electric valve 21→second electric valve 22→outdoor heat exchanger 300→first one-way valve 51→expansion valve 40→battery pack heat exchanger 500→first switch valve 31→gas-liquid separator 800→compressor 600. It should be noted that, in this mode, although the refrigerant flowing out of the outlet of the compressor 600 flows through the indoor condenser 200, the indoor condenser 200 may not be blown by a fan or a blower, so that the high-temperature and high-pressure refrigerant flowing into the indoor condenser 200 is not exothermally condensed in the indoor condenser 200. That is to say, in this mode, the indoor condenser 200 functions as a through flow channel.

Referring to FIG. 1 to FIG. 9, in conjunction with the integrated valve module 100 provided in the present disclosure, an example flow path of the refrigerant is: compressor 600→indoor condenser 200→indoor condenser outlet interface 201→first port of first electric valve 21→second port of first electric valve 21→first opening 301→first branch channel 1111→second opening 302→first port of second electric valve 22→second port of second electric valve 22→outdoor heat exchanger inlet interface 202→outdoor heat exchanger 300→outdoor heat exchanger outlet interface 203→third opening 303→second branch channel 12→fifth opening 305→first port of first one-way valve 51→second port of first one-way valve 51→first port of expansion valve 40→second port of expansion valve 40→battery pack heat exchanger first interface 208→battery pack heat exchanger 500→battery pack heat exchanger second interface 209→thirteenth opening 313→fourth branch channel 14→fourteenth opening 314→first port of first switch valve 31→second port of first switch valve 31→eleventh opening 311→third branch channel 13→eighth opening 308→gas-liquid separator inlet interface 211→gas-liquid separator 800→compressor 600.

In this mode, the first port of the first electric valve 21 is in communication with the second port of the first electric valve 21, and the first electric valve 21 functions as the switch valve, and the refrigerant is not throttled. The expansion valve 40 performs throttling-induced pressure reduction on the refrigerant, so that the low-temperature and low-pressure refrigerant can evaporate and absorb heat in the battery pack heat exchanger 500.

4. Battery Heating Mode

Referring to FIG. 1, in this mode, a main flow path of the refrigerant is: compressor 600→second switch valve 32→battery pack heat exchanger 500→second check valve 52→motor heat exchanger 700→third electric valve 23→gas-liquid separator→compressor 600. The high-temperature refrigerant from the compressor 600 is configured to exchange heat with the battery pack heat exchanger 500 to heat the battery.

Referring to FIG. 1 to FIG. 9, in conjunction with the integrated valve module 100 provided in the present disclosure, an example flow path of the refrigerant is: compressor 600→compressor outlet interface 210→first port of first switch valve 31→second port of first switch valve 31→twelfth opening 312→fourth branch channel 14→thirteenth opening 313→second interface 209 of battery pack heat exchanger→battery pack heat exchanger 500→first interface 208 of battery pack heat exchanger→first port of second check valve 52→second port of second check valve 52→tenth opening 310→first branch channel 1111→first interface 204 of motor heat exchanger→motor heat exchanger 700→second interface 205 of motor heat exchanger→fifth opening 305→second branch channel 12→fourth opening 304→first port of third electric valve 23→third port of third electric valve 23→sixth opening 306→third branch channel 13→eighth opening 308→gas-liquid separator inlet interface 211→gas-liquid separator 800→compressor 600.

In this mode, the expansion valve 40 throttles the refrigerant, so that the low-temperature and low-pressure refrigerant can evaporate and absorb heat in the motor heat exchanger 700. The first port of the third electric valve 23 is in communication with the third port of the third electric valve 23, and the third electric valve 23 functions as a switch valve.

5. Mode Enabling Both Air Conditioning Refrigeration and Battery Cooling

In this mode, the flow path of the refrigerant is divided into two, with one of the two following a flow path as follows: compressor 600→indoor condenser 200→first electric valve 21→second electric valve 22→outdoor heat exchanger 300→third electric valve 23→indoor evaporator 400→gas-liquid separator 800→compressor 600. the other of the two following a flow path as follows: compressor 600→indoor condenser 200→first electric valve 21→second electric valve 22→outdoor heat exchanger 300→first one-way valve 51→expansion valve 40→battery pack heat exchanger 500→first switch valve 31→gas-liquid separator 800→compressor 600.

It should be noted that, in this mode, although the refrigerant flowing out of the outlet of the compressor 600 flows through the indoor condenser 200, the indoor condenser 200 may not be blown by a fan or a blower, so that the high-temperature and high-pressure refrigerant flowing into the indoor condenser 200 is not exothermally condensed in the indoor condenser 200. That is to say, in this mode, the indoor condenser 200 functions as a through flow channel.

In this mode, the flow of the refrigerant through the components and flow channels can be found in the previous description of the air conditioning refrigeration mode and the battery cooling mode. Details are not described herein again.

6. Mode Enabling Both Air Conditioning Refrigeration and Battery Heating

Referring to FIG. 1, in this mode, the flow path of the refrigerant is divided into two, with one of the two following a flow path as follows: compressor 600→indoor condenser 200→first electric valve 21→second electric valve 22→outdoor heat exchanger 300→third electric valve 23→indoor evaporator 400→gas-liquid separator 800→compressor 600. the other of the two following a flow path as follows: compressor 600→second switch valve 32→battery pack heat exchanger 500→second check valve 52→motor heat exchanger 700→third electric valve 23→gas-liquid separator 800→compressor 600. The high-temperature refrigerant from the compressor 600 is configured to exchange heat with the battery pack heat exchanger 500 to heat the battery.

It should be noted that, in this mode, although the refrigerant flowing out of the outlet of the compressor 600 flows through the indoor condenser 200, the indoor condenser 200 may not be blown by a fan or a blower, so that the high-temperature and high-pressure refrigerant flowing into the indoor condenser 200 is not exothermally condensed in the indoor condenser 200. That is to say, in this mode, the indoor condenser 200 functions as a through flow channel.

In this mode, the flow of the refrigerant through the components and flow channels can be found in the previous description of the air conditioning refrigeration mode and the battery cooling mode. Details are not described herein again.

7. Mode Enabling Both Heat Pump Heating and Battery Heating

Referring to FIG. 1, in this mode, the flow path of the refrigerant is divided into two, with one of the two following a flow path as follows: compressor 600→indoor condenser 200→first electric valve 21→second electric valve 22→motor heat exchanger 700→third electric valve 23→gas-liquid separator 800→compressor 600. In this mode, the refrigerant flowing out of the outlet of the compressor 600 releases heat in the indoor condenser 200, and the indoor condenser 200 releases heat and combines with the wind heating PTC to heat the vehicle. the other of the two following a flow path as follows: compressor 600→second switch valve 32→battery pack heat exchanger 500→second check valve 52→motor heat exchanger 700→third electric valve 23→gas-liquid separator 800→compressor 600. The high-temperature refrigerant from the compressor 600 is configured to exchange heat with the battery pack heat exchanger 500 to heat the battery.

In this mode, the flow of the refrigerant through the components and flow channels can be found in the previous description of the heat pump heating mode and the battery heating mode. Details are not described herein again.

8. Mode Enabling Both Heat Pump Heating and Battery Cooling

Referring to FIG. 1, in this mode, the flow path of the refrigerant is divided into two, with one of the two following a flow path as follows: compressor 600→indoor condenser 200→first electric valve 21→second electric valve 22→motor heat exchanger 700→third electric valve 23→gas-liquid separator 800→compressor 600. In this mode, the refrigerant flowing out of the outlet of the compressor 600 releases heat in the indoor condenser 200, and the indoor condenser 200 releases heat and combines with the wind heating PTC to heat the vehicle. the other of the two following a flow path as follows: compressor 600→indoor condenser 200→first electric valve 21→second electric valve 22→outdoor heat exchanger 300→first one-way valve 51→expansion valve 40→battery pack heat exchanger 500→first switch valve 31→gas-liquid separator 800→compressor 600. It should be noted that, in this mode, although the refrigerant flowing out of the outlet of the compressor 600 flows through the indoor condenser 200, the indoor condenser 200 may not be blown by a fan or a blower, so that the high-temperature and high-pressure refrigerant flowing into the indoor condenser 200 is not exothermally condensed in the indoor condenser 200. That is to say, in this mode, the indoor condenser 200 functions as a through flow channel. In this mode, the flow of the refrigerant through the components and flow channels can be found in the previous description of the heat pump heating mode and the battery cooling mode. Details are not described herein again.

9. Mode Enabling Both Air Conditioning Refrigeration and Air Conditioning and Heating Dehumidification In in this mode, the main flow path of the refrigerant is: compressor 600→indoor condenser 200→first electric valve 21→second electric valve 22→outdoor heat exchanger 300→third electric valve 23→indoor evaporator 400→gas-liquid separator 800→compressor 600.

In conjunction with the integrated valve module 100 provided in the present disclosure, an example flow path of the refrigerant is: compressor 600→indoor condenser 200→indoor condenser outlet interface 201→first port of first electric valve 21→second port of first electric valve 21→first opening 301→first branch channel 1111→second opening 302→first port of second electric valve 22→second port of second electric valve 22→outdoor heat exchanger inlet interface 202→outdoor heat exchanger 300→outdoor heat exchanger outlet interface 203→third opening 303→second branch channel 12→fourth opening 304→first port of third electric valve 23→second port of third electric valve 23→indoor evaporator inlet interface 206→indoor evaporator 400→indoor evaporator outlet interface 207→seventh opening 307→third branch channel 13→eighth opening 308→gas-liquid separator inlet interface 211→gas-liquid separator 800→compressor 600.

In this mode, the refrigerant flowing out of the outlet of the compressor 600 releases heat in the indoor condenser 200, and the refrigerant entering the indoor evaporator 400 evaporates and absorbs heat, absorbs the heat of the indoor environment, and causes an indoor moist air to reach a dew point temperature and condense into water for discharge to realize the dehumidification effect. The dehumidified environment and the heat release of the indoor condenser 200 cause an ambient temperature to reach a more comfortable temperature, and the wind can be blown into a crew compartment through a fan to achieve a more comfortable ambient temperature in the crew compartment.

In this mode, the first port of the first electric valve 21 is in communication with the second port of the first electric valve 21, and the first electric valve 21 functions as the switch valve, and the refrigerant is not throttled. The first port of the third electric valve 23 is in communication with the second port of the third electric valve 23. The third electric valve 23 functions an expansion valve to perform throttling-induced pressure reduction on the refrigerant, so that the low-temperature and low-pressure refrigerant can evaporate and absorb heat in the indoor evaporator 400.

10. Mode Enabling Air Conditioning Refrigeration, Air Conditioning and Heating Dehumidification, and Battery Cooling In this mode, the flow path of the refrigerant is divided into two, with one of the two following a flow path as follows: compressor 600→indoor condenser 200→first electric valve 21→second electric valve 22→outdoor heat exchanger 300→third electric valve 23→indoor evaporator 400→gas-liquid separator 800→compressor 600. the other of the two following a flow path as follows: compressor 600→indoor condenser 200→first electric valve 21→second electric valve 22→outdoor heat exchanger 300→first one-way valve 51→expansion valve 40→battery pack heat exchanger 500→first switch valve 31→gas-liquid separator 800→compressor 600.

In this mode, the refrigerant flowing out of the outlet of the compressor 600 releases heat in the indoor condenser 200, and the refrigerant entering the indoor evaporator 400 evaporates and absorbs heat, absorbs the heat of the indoor environment, and causes an indoor moist air to reach a dew point temperature and condense into water for discharge to realize the dehumidification effect. The dehumidified environment and the heat release of the indoor condenser 200 cause an ambient temperature to reach a more comfortable temperature, and the wind can be blown into a crew compartment through a fan to achieve a more comfortable ambient temperature in the crew compartment.

11. Mode Enabling Air Conditioning Refrigeration, Air Conditioning and Heating Dehumidification, and Battery Heating In this mode, the flow path of the refrigerant is divided into two, with one of the two following a flow path as follows: compressor 600→indoor condenser 200→first electric valve 21→second electric valve 22→outdoor heat exchanger 300→third electric valve 23→indoor evaporator 400→gas-liquid separator 800→compressor 600. the other of the two following a flow path as follows: compressor 600→second switch valve 32→battery pack heat exchanger 500→second check valve 52→motor heat exchanger 700→third electric valve 23→gas-liquid separator 800→compressor 600. The high-temperature refrigerant from the compressor 600 is configured to exchange heat with the battery pack heat exchanger 500 to heat the battery.

In this mode, the refrigerant flowing out of the outlet of the compressor 600 releases heat in the indoor condenser 200, and the refrigerant entering the indoor evaporator 400 evaporates and absorbs heat, absorbs the heat of the indoor environment, and causes an indoor moist air to reach a dew point temperature and condense into water for discharge to realize the dehumidification effect. The dehumidified environment and the heat release of the indoor condenser 200 cause an ambient temperature to reach a more comfortable temperature, and the wind can be blown into a crew compartment through a fan to achieve a more comfortable ambient temperature in the crew compartment.

It may be understood that, in the present disclosure, in addition to the above typical modes, the specific structure of the vehicle thermal management system is provided based on the present disclosure, and the vehicle thermal management system may also have any proper thermal management mode, which is not limited in the present disclosure.

The implementations of the present disclosure are described in detail above with reference to the accompanying drawings. However, the present disclosure is not limited to the specific details in the foregoing implementations, multiple simple deformations may be made to the technical solution of the present disclosure within a range of the technical concept of the present disclosure, and these simple deformations fall within the protection scope of the present disclosure.

Moreover, it should be noted that the specific technical features described in the foregoing specific implementations may be combined in any proper manner in the case of no contradiction. In order to avoid unnecessary repetition, various possible combinations are not described separately in the present disclosure.

In addition, various implementations of the present disclosure may also be arbitrarily combined without departing from the idea of the present disclosure, and the combinations shall still be regarded as the content disclosed in the present disclosure.

What is claimed is:

1. An integrated valve module, comprising:
    a body, a first flow channel being disposed in the body, the first flow channel comprising a first branch channel;
    an interface, disposed on the body, configured to be connected with a corresponding thermal management device in a thermal management system, and comprising an indoor condenser outlet interface, an outdoor heat exchanger inlet interface, and a first interface of a motor heat exchanger; and
    a valve set, disposed on the body and comprising a first electric valve and a second electric valve,
    wherein a first port of the first electric valve is connected with the indoor condenser outlet interface; a second port of the second electric valve is connected with the outdoor heat exchanger inlet interface; a third port of the second electric valve is connected with the first interface of the motor heat exchanger; and
    the first branch channel comprises a first opening and a second opening, the first opening being configured to be in communication with a second port of the first electric valve and a third port of the first electric valve, and the second opening being configured to be in communication with a first port of the second electric valve, and the second port of the first electric valve or the third port of the first electric valve is in communication with the outdoor heat exchanger inlet interface and the first interface of the motor heat exchanger through the first branch channel.

2. The module according to claim 1, wherein
    the interface further comprises an outdoor heat exchanger outlet interface, an indoor evaporator inlet interface, and a second interface of the motor heat exchanger; when one of the first interface of the motor heat exchanger and the second interface of the motor heat exchanger is connected with an inlet of the motor heat exchanger, the other one of the first interface of the motor heat exchanger and the second interface of the motor heat exchanger is connected with an outlet of the motor heat exchanger;
    the first flow channel further comprises a second branch channel;
    the valve set further comprises a third electric valve;
    wherein the second branch channel comprises a third opening, a fourth opening, and a fifth opening, the third opening is configured to be in communication with the outdoor heat exchanger outlet interface, the fourth opening is configured to be in communication with a first port of the third electric valve, and the fifth opening is configured to be in communication with the second interface of the motor heat exchanger,
    the first port of the third electric valve is in communication with the outdoor heat exchanger outlet interface and the second interface of the motor heat exchanger through the second branch channel, and the second port of the third electric valve is connected with the indoor evaporator inlet interface.

3. The module according to claim 1, wherein
    the interface further comprises a gas-liquid separator inlet interface and an indoor evaporator outlet interface;
    the first flow channel further comprises a third branch channel; and
    the third branch channel comprises a sixth opening, a seventh opening, and an eighth opening, the sixth opening is configured to be in communication with a third port of a third electric valve, the seventh opening is configured to be in communication with the indoor evaporator outlet interface, and the eighth opening is configured to be in communication with the gas-liquid separator inlet interface, and the third port of the third electric valve and the indoor evaporator outlet interface are in communication with the gas-liquid separator inlet interface through the third branch channel.

4. The module according to claim 3, further comprising a first temperature sensor, a temperature sensor interface in communication with the third branch channel and being disposed on the body; the temperature sensor interface being located between the indoor evaporator outlet interface and the gas-liquid separator inlet interface; and a detection terminal of the first temperature sensor extending into the temperature sensor interface and being located in the third branch channel.

5. The module according to claim 2, wherein the interface further comprises a first interface of a battery pack heat exchanger and a first one-way valve,
wherein the second branch channel comprises a ninth opening configured to be in communication with a first port of the first one-way valve, and the first port of the first one-way valve is in communication with the outdoor heat exchanger outlet interface through the second branch channel; a second port of the first one-way valve is connected with the first interface of the battery pack heat exchanger; and the first one-way valve is configured to allow a fluid to flow in a direction from the first port of the first one-way valve toward the second port of the first one-way valve.

6. The module according to claim 5, wherein
the valve set further comprises a second one-way valve; and
a first port of the second one-way valve is connected with the first interface of the battery pack heat exchanger; and the first branch channel comprises a tenth opening configured to be in communication with a second port of the second one-way valve, and the second port of the second one-way valve is in communication with the first interface of the motor heat exchanger through the first branch channel.

7. The module according to claim 6, wherein
the interface further comprises a gas-liquid separator inlet interface and a second interface of the battery pack heat exchanger; when one of the first interface of the battery pack heat exchanger and the second interface of the battery pack heat exchanger is connected with an inlet of the battery pack heat exchanger, the other one of the first interface of the battery pack heat exchanger and the second interface of the battery pack heat exchanger is connected with an outlet of the battery pack heat exchanger;
the first flow channel further comprises a third branch channel;
the valve set further comprises an expansion valve and a first switch valve; a first port of the expansion valve is connected with the second port of the first one-way valve and the first port of the second one-way valve; a second port of the expansion valve is connected with the first interface of the battery pack heat exchanger; and
a first port of the first switch valve is connected with the second interface of the battery pack heat exchanger; and the third branch channel comprises an eleventh opening configured to be in communication with a second port of the first switch valve, and the second port of the first switch valve is in communication with the gas-liquid separator inlet interface through the third branch channel.

8. The module according to claim 7, wherein
the interface further comprises a compressor outlet interface;
the first flow channel further comprises a fourth branch channel;
the expansion valve comprises a two-way expansion valve; the valve set further comprises a second switch valve; a first port of the second switch valve is connected with the compressor outlet interface; and
the fourth branch channel comprises a twelfth opening, a thirteenth opening, and a fourteenth opening, the twelfth opening is configured to be in communication with a second port of the second switch valve, the thirteenth opening is configured to be in communication with the second interface of the battery pack heat exchanger, and the fourteenth opening is configured to be in communication with the first port of the first switch valve, and the second port of the second switch valve and the second interface of the battery pack heat exchanger are in communication with the first port of the first switch valve through the fourth branch channel.

9. The module according to claim 1, wherein
the body comprises a first portion and a second portion; the first portion comprises a first connecting surface; the second portion comprises a second connecting surface; the first connecting surface is connected with the second connecting surface; and
at least one groove is disposed on the first connecting surface, and the at least one groove on the first connecting surface and the second connecting surface define the first flow channel; or
at least one groove is disposed on the second connecting surface, and the at least one groove on the second connecting surface and the first connecting surface define the first flow channel.

10. The module according to claim 1, wherein the first flow channel comprises a curved flow channel or a linear flow channel.

11. The module according to claim 1, wherein:
the body comprises a first portion and a second portion; the first portion comprises a first connecting surface; the second portion comprises a second connecting surface; the first connecting surface is connected with the second connecting surface;
at least one groove is disposed on the first connecting surface; at least one groove on the first connecting surface and the second connecting surface define the first flow channel; a plurality of second flow channels are disposed inside the first portion; and the valve set is in communication with a corresponding opening disposed on the first flow channel through the second flow channels.

12. The module according to claim 1, wherein the valve set is in communication with a corresponding opening disposed on the first flow channel; and a valve core of a valve in the valve set is in communication with the corresponding opening.

13. A vehicle thermal management system, comprising an integrated valve module comprising:
a body, a first flow channel being disposed in the body, the first flow channel comprising a first branch channel;

an interface, disposed on the body, configured to be connected with a corresponding thermal management device in a thermal management system, and comprising an indoor condenser outlet interface, an outdoor heat exchanger inlet interface, and a first interface of a motor heat exchanger; and a valve set, disposed on the body and comprising a first electric valve and a second electric valve, wherein a first port of the first electric valve is connected with the indoor condenser outlet interface; a second port of the second electric valve is connected with the outdoor heat exchanger inlet interface; a third port of the second electric valve is connected with the first interface of the motor heat exchanger; and the first branch channel comprises a first opening and a second opening, the first opening being configured to be in communication with a second port of the first electric valve and a third port of the first electric valve, and the second opening being configured to be in communication with a first port of the second electric valve, and the second port of the first electric valve or the third port of the first electric valve is in communication with the outdoor heat exchanger inlet interface and the first interface of the motor heat exchanger through the first branch channel.

14. The vehicle thermal management system according to claim 13, wherein the interface further comprises an outdoor heat exchanger outlet interface, an indoor evaporator inlet interface, and a second interface of the motor heat exchanger; when one of the first interface of the motor heat exchanger and the second interface of the motor heat exchanger is connected with an inlet of the motor heat exchanger, the other one of the first interface of the motor heat exchanger and the second interface of the motor heat exchanger is connected with an outlet of the motor heat exchanger;

the first flow channel further comprises a second branch channel;

the valve set further comprises a third electric valve;

wherein the second branch channel comprises a third opening, a fourth opening, and a fifth opening, the third opening is configured to be in communication with the outdoor heat exchanger outlet interface, the fourth opening is configured to be in communication with a first port of the third electric valve, and the fifth opening is configured to be in communication with the second interface of the motor heat exchanger, the first port of the third electric valve is in communication with the outdoor heat exchanger outlet interface and the second interface of the motor heat exchanger through the second branch channel, and the second port of the third electric valve is connected with the indoor evaporator inlet interface.

15. The vehicle thermal management system according to claim 13, wherein the interface further comprises a gas-liquid separator inlet interface and an indoor evaporator outlet interface;

the first flow channel further comprises a third branch channel; and the third branch channel comprises a sixth opening, a seventh opening, and an eighth opening, the sixth opening is configured to be in communication with a third port of a third electric valve, the seventh opening is configured to be in communication with the indoor evaporator outlet interface, and the eighth opening is configured to be in communication with the gas-liquid separator inlet interface, and the third port of the third electric valve and the indoor evaporator outlet interface are in communication with the gas-liquid separator inlet interface through the third branch channel.

16. The vehicle thermal management system according to claim 15, further comprising a first temperature sensor, a temperature sensor interface in communication with the third branch channel and being disposed on the body; the temperature sensor interface being located between the indoor evaporator outlet interface and the gas-liquid separator inlet interface; and a detection terminal of the first temperature sensor extending into the temperature sensor interface and being located in the third branch channel.

17. The vehicle thermal management system according to claim 14, wherein the interface further comprises a first interface of a battery pack heat exchanger and a first one-way valve, wherein the second branch channel comprises a ninth opening configured to be in communication with a first port of the first one-way valve, and the first port of the first one-way valve is in communication with the outdoor heat exchanger outlet interface through the second branch channel; a second port of the first one-way valve is connected with the first interface of the battery pack heat exchanger; and the first one-way valve is configured to allow a fluid to flow in a direction from the first port of the first one-way valve toward the second port of the first one-way valve.

18. The vehicle thermal management system according to claim 17, wherein the valve set further comprises a second one-way valve; and a first port of the second one-way valve is connected with the first interface of the battery pack heat exchanger; and the first branch channel comprises a tenth opening configured to be in communication with a second port of the second one-way valve, and the second port of the second one-way valve is in communication with the first interface of the motor heat exchanger through the first branch channel.

19. The vehicle thermal management system according to claim 18, wherein the interface further comprises a gas-liquid separator inlet interface and a second interface of the battery pack heat exchanger; when one of the first interface of the battery pack heat exchanger and the second interface of the battery pack heat exchanger is connected with an inlet of the battery pack heat exchanger, the other one of the first interface of the battery pack heat exchanger and the second interface of the battery pack heat exchanger is connected with an outlet of the battery pack heat exchanger;

the first flow channel further comprises a third branch channel;

the valve set further comprises an expansion valve and a first switch valve; a first port of the expansion valve is connected with the second port of the first one-way valve and the first port of the second one-way valve; a second port of the expansion valve is connected with the first interface of the battery pack heat exchanger; and a first port of the first switch valve is connected with the second interface of the battery pack heat exchanger; and the third branch channel comprises an eleventh opening configured to be in communication with a second port of the first switch valve, and the second port of the first switch valve is in communication with the gas-liquid separator inlet interface through the third branch channel.

20. A vehicle, comprising a vehicle thermal management system comprising an integrated valve module, wherein the integrated valve module comprises:
- a body, a first flow channel being disposed in the body, the first flow channel comprising a first branch channel;
- an interface, disposed on the body, configured to be connected with a corresponding thermal management device in a thermal management system, and comprising an indoor condenser outlet interface, an outdoor heat exchanger inlet interface, and a first interface of a motor heat exchanger; and
- a valve set, disposed on the body and comprising a first electric valve and a second electric valve,
- wherein a first port of the first electric valve is connected with the indoor condenser outlet interface; a second port of the second electric valve is connected with the outdoor heat exchanger inlet interface; a third port of the second electric valve is connected with the first interface of the motor heat exchanger; and
- the first branch channel comprises a first opening and a second opening, the first opening being configured to be in communication with a second port of the first electric valve and a third port of the first electric valve, and the second opening being configured to be in communication with a first port of the second electric valve, and the second port of the first electric valve or the third port of the first electric valve is in communication with the outdoor heat exchanger inlet interface and the first interface of the motor heat exchanger through the first branch channel.

\* \* \* \* \*